United States Patent Office 3,561,283
Patented Feb. 9, 1971

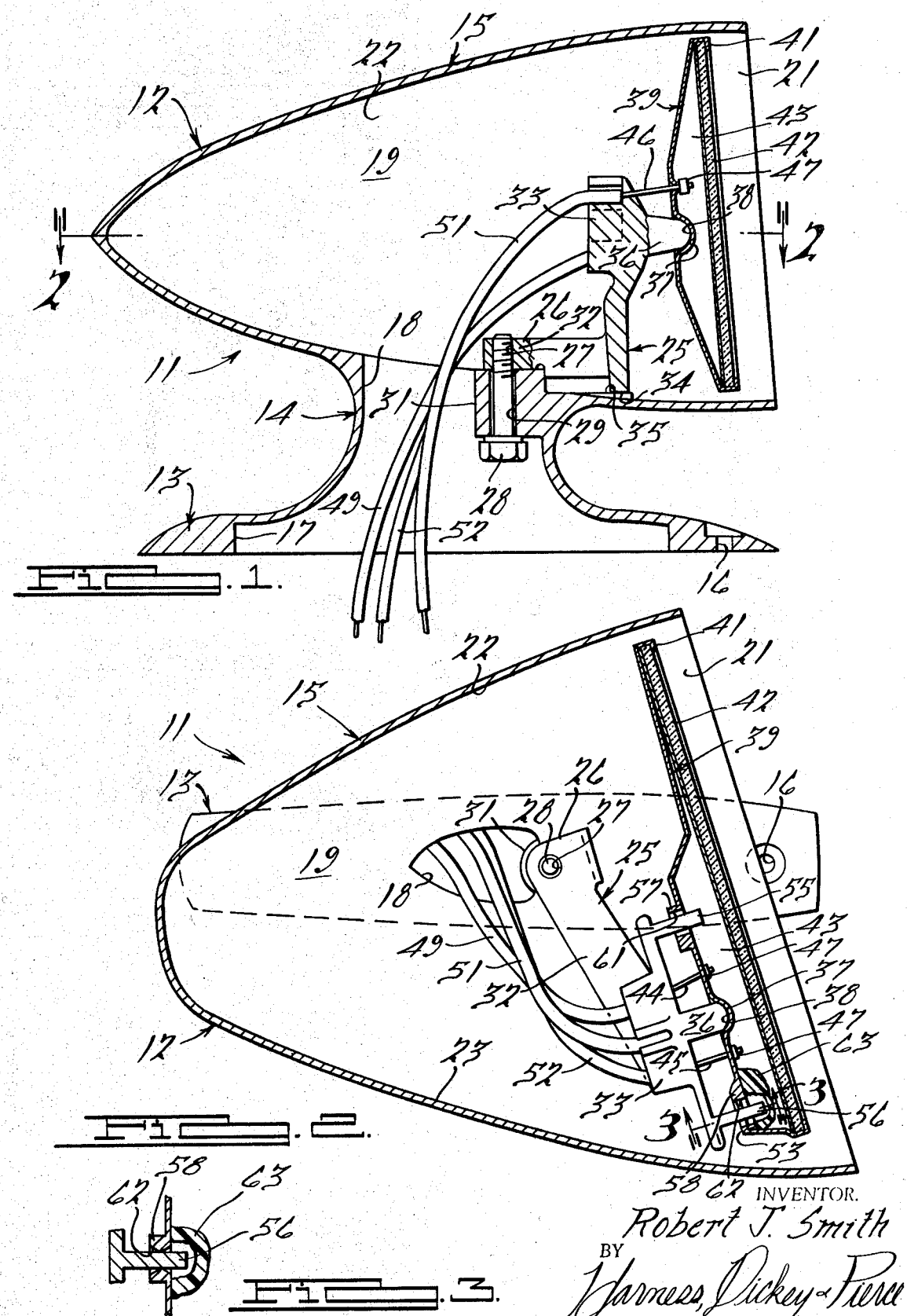

3,561,283
REMOTE CONTROL MIRROR
Robert J. Smith, Farmington, Mich., assignor to C. M.
Hall Lamp Company, a corporation of Michigan
Filed Oct. 18, 1968, Ser. No. 768,724
Int. Cl. F16c 1/12; G02b 5/08
U.S. Cl. 74—501
10 Claims

ABSTRACT OF THE DISCLOSURE

A remote controlled, outside, automotive rear view mirror embodying a streamlined outer housing in which a mirror is pivotally supported about an asymmetric pivot pin. The mirror includes a backing plate to which the reflective portion is affixed by a snap flange arangement and which defines a socket and spaced guides that coact with fixed pins to preclude any substantial rotation of the mirror while permitting its pivotal adjustment.

BACKGROUND OF THE INVENTION

This invention relates to a remote controlled mirror and more particularly to a sports type remote controlled, outside, automotive rear view mirror.

Various types of remote controlled, outside, rear view mirrors have been proposed for automotive use. Conventionally these mirrors are comprised of a supporting assembly upon which the reflective portion of the mirror is supported for pivotal movement about a pivot point that lies substantially at the center of the mirror. Some form of remote control apparatus, normally flexible or Bowden wire transmitters, interconnect the mirror with a control device positioned in the interior of the vehicle for the remote adjustment. In order to protect the flexible transmitters at their point of connection to the mirror and the pivotal support for the mirror, it has been conventional to surround the mirror within a portion of an outer housing. The shapes of such housings have, however, been heretofore limited to generally rectangular or circular configurations to permit the desired range of pivotal movement of the centally supported mirror. Such configurations are not suitable from a styling standpoint, however, in many applications, particularly in connection with the so-called "sporty" type cars. One type of mirror that is commonly associated with this type of vehicle incorporates a generally bullet-shaped mirror housing that is asymmetric. It was, heretofore, thought impossible to use a remote controlled mirror with this type of styling due to the interference of the housing with the pivotal movement of the mirror if the mirror was centrally supported.

It is, therefore, a principal object of this invention to provide an improved, remote controlled mirror suitable for use in an asymmetric housing.

It is another object of this invention to provide a remote controlled mirror supported for pivotal movement about an offset pivot axis.

In certain types of remote controlled mirrors, a ball and socket connection supports the mirror head for universal pivotal movement. A structure is required, however, to preclude rotation of the mirror about this connection. This rotation has heretofore been precluded by the coaction of a pin and guide bushing that is supported by the mirror backing plate. The guide bushings normally used for this purpose are nylon or other plastic members that are molded or otherwise fixed to the mirror backing plate, which is normally a metal element. Obviously, this construction is expensive.

It is, therefore, another object of this invention to provide a mirror head assembly in which a guide bushing is formed integrally with the mirror backing plate.

SUMMARY OF THE INVENTION

A mirror embodying this invention is particularly adapted for use with a motor vehicle or the like and is comprised of an outer housing and a mirror. The outer housing is adapted to be supported upon the vehicle and defines a cavity open at one end that is adapted to receive the mirror. The mirror is supported for pivotal movement within the housing cavity for pivotal movement in at least one plane about a pivot axis extending substantially perpendicularly with respect to the plane. The portion of the housing lying within the plane and defining the cavity on one side of the mirror has a part that extends toward the mirror and which is spaced from the midpoint of the mirror in the plane a distance less than the distance between the midpoint and the adjacent portion of the mirror. The pivot axis of the mirror is offset from the midpoint toward the adjacent housing part for precluding interference between the mirror and the housing part upon pivotal movement of the mirror.

A further feature of the invention is embodied in a reflective mirror and a backing plate for supporting the mirror. The backing plate is formed with means defining a journal portion for pivotally supporting the mirror assembly. The backing plate futher defines an integral guide bushing which, in turn, forms an opening in the backing plate spaced from the journal portion for receiving a co-operating guide pin to hold the mirror assembly against any substantial rotary movement without interfering with its pivotal adjustment.

BRIEF DESCRIPTION OF THE DRAWINGS

FIG. 1 is a cross-sectional view of a remote controlled, automotive rear view mirror embodying this invention and taken along a substantially vertically extending plane.

FIG. 2 is a horizontal cross-sectional view taken substantially along the line 2—2 of FIG. 1.

FIG. 3 is a cross-sectional view taken along the line 3—3 of FIG. 2.

DETAILED DESCRIPTION OF THE PREFERRED EMBODIMENT

A remote controlled, outside automotive rear view mirror embodying this invention is identified generally by the reference numeral 11. Only the portion of the mirror assembly 11 that is adapted to be mounted on the exterior sheet metal of the vehicle has been shown in the drawings since the specific mechanism for controlling the position of the mirror and the remote operator, which is mounted in the passenger or driver's compartment of the associated vehicle, forms no part of this invention. The mirror assembly 11 includes an outer housing, indicated generally by the reference numeral 12, which is comprised of a mounting or base portion 13, an upwardly extending arm 14 and a hood 15. The base portion 13 is generally elongated and is provided with one or more openings 16 that are adapted to receive threaded fasteners (not shown) for affixing the mirror assembly 11 to the exterior sheet metal of the associated vehicle. An enlarged opening 17 is also formed in the base portion 13, which opening blends into an opening 18 formed in the arm 14.

The hooded portion 15 has a generally streamlined configuration as clearly shown in the drawings and defines a cavity 19 which is open at its rearward end, as at 21. The cavity 19 is in registry with the opening 18 in the arm portion 14. In a horizontal plane passing generally through the center of the hooded portion 15 (FIG. 2) the cavity 19 is defined by opposing surfaces or edges 22 and 23 that diverge from the forward end of the portion 15 toward the opening 21. The surface 22 is nearly straight or is curved about a relatively large radius of curvature while the surface 23 is generally straight except in the area immediately adjacent the open end 21 where the surface 23 is more abruptly curved. The general streamlined shape of the hooded portion 15 gives the mirror assembly 11 a racing or sports type appearance.

A support member, indicated generally by the reference numeral 25, is positioned within the cavity 19. The supporting member 25 has a mounting portion 26 in which a tapped opening 27 is formed. A bolt 28 passes through a cylindrical bore 29 formed in a boss 31 which is formed integrally with the arm portion 14 and which extends into its opening 18. The bolt 28 is received in the tapped opening 27 of the supporting member 25 to affix the supporting member 25 in the cavity 19. It will be noted that the boss 31 and mounting portion 26 are disposed substantially on a line lying perpendicularly from the midpoint of the opening 21 within the plane of FIG. 2.

An offset arm 32 extends integrally from the mounting portion 26 toward the surface 23 and particularly the part of this surface adjacent open end 21. The arm 32 terminates in an integral, upstanding journal portion 33. The journal portion 33 defines a lower face 34 that engages a shoulder 35 formed in the hooded portion 15 for aiding in the support of the supporting member 25. The journal portion 33 has a rearwardly extending cylindrical portion 36 that terminates at its rearward end in a semi-spherical section 37. The semi-spherical section 37 is received in a complementary opening 38 formed in a mirror backing plate, indicated generally by the reference numeral 39, at one side of this backing plate. Thus, the surface 37 and cavity 38 form a ball and socket assembly for pivotally journaling the mirror backing plate 39 about an axis that is eccentrically disposed with respect to the center line of the opening 21.

The backing plate 39 is formed from a semi-resilient synthetic plastic such as polypropylene or the like and has an outer peripheral flange 41. A mirror 42 is received in the pericheral flange 41 for affixing the mirror 42 to the backing plate 39. The resiliency of the flange 41 permits the mirror 42 to be snapped in place so that adhesive or other securing means are not required to connect these components.

The backing plate 39 is relieved in the area adjacent the socket cavity 38 to provide a clearance volume 43 between the backing plate 39 and the mirror 42. One end of each of a plurality of flexible transmitters 44, 45 and 46 extends through the backing plate 39 into the cavity 43. These ends of the flexible transmitters 44 through 46 are held against axial movement relative to the backing plate 39, as at 47, in any known manner. The flexible transmitters 44 through 46 are encircled by protective sheaths 49, 51 and 52, respectively, the ends of which are affixed in any known manner to the supporting member journal portion 33. The flexible sheaths 49, 51 and 52 and contained flexible transmitters 44, 45 and 46 extend through the cavity 19 and openings 18 and 17 for connection to the remotely positioned actuator so that the mirror 42 may be pivotally adjusted from a remote location in a known manner.

An inspection of FIG. 2 will reveal that the surfaces 22 and 23 of the mirror outer housing 12 are asymmetric with respect to the aforenoted center line that extends perpendicular to the opening 21 and in the plane of FIG. 2. It should be readily apparent that pivotal support of the mirror 42 on this center line would result in interference between an outstanding edge 53 of the mirror backing plate 39 and the adjacent housing surface 23. This engagement would severely limit the degree of pivotal adjustment of the mirror 42. However, since the pivot axis of the mirror 42 is offset due to the construction described, such interference will not exist since the edge 53 does not move as great a distance for a given angular movement as if the mirror 42 were pivotally supported at a central location.

In order to prevent any substantial rotation of the mirror 42 about the surface 37, the journal portion 33 is formed with outstanding pin parts 55 and 56 that extend through guide bushings 57 and 58 formed integrally with the backing plate 39. These guide bushings 57 and 58 define openings 61 and 62 that receive the pin parts 55 and 56 to preclude any substantial rotation without interferring with the pivotal movement. Although such guide arrangements have been previously proposed, they have been provided by separate bushing members that have been attached to the heretofore employed sheet metal backing plates. Thus, the use of the plastic backing plate not only permits the snap connection between the backing plate and mirror previously described, but obviously obviates the need for separate guide bushings.

Due to the eccentric support of the mirror 42, vibrations might tend to alter the angular adjustment. In order to prevent this, a counterbalancing mass 63 may be affixed to the backing plate 39 within the cavity 43 on the side of the mirror assembly closest to the housing surface 23. The mass 63 should be sufficiently large so as to counterbalance the mirror. That is, the center of gravity of the mirror assembly including the mirror 42 and backing plate 39 should be coincident with the center of the cavity 38.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A mirror for use with a motor vehicle or the like comprising an outer housing adapted to be supported upon the vehicle, said outer housing defining a cavity open at one end and adapted to receive an adjustable mirror therein, a mirror received in said cavity adjacent said open end, and means for supporting said mirror within said housing cavity for pivotal movement in at least one plane about a pivot axis extending substantially perpendicularly with respect to said plane, the portion of said housing lying in said plane and defining said cavity on one side of said mirror having a part extending toward said mirror and being spaced from the midpoint of said mirror in said plane a distance less than the distance between said midpoint and an adjacent portion of said mirror, the pivot axis of said mirror being offset from said midpoint toward said adjacent housing part for precluding interference with the pivotal movement of said mirror by said housing part.

2. A mirror as set forth in claim 1 wherein the mirror is supported for universal pivotal movement about the pivot axis.

3. A mirror as set forth in claim 2 further including flexible transmitter means operatively connected to the mirror for remote adjustment of said mirror.

4. A mirror as set forth in claim 1 wherein the part of the housing that extends toward the mirror is curved, the part of the housing on the opposite side of said mirror and in said plane being substantially straight.

5. A mirror as set forth in claim 1 further including a balancing mass affixed to the mirror on the one side of its pivot axis.

6. A mirror as set forth in claim 1 wherein the mirror is comprised of a reflective surface and a backing plate, said backing plate defining an integral guide bushing having an opening therein, the means for pivotally supporting the mirror including a pin portion extending into said guide opening for precluding any substantial rotation of said mirror relative to the outer housing without interferring with the pivotal adjustment of said mirror.

7. A remote controlled, outside, automotive rear view mirror comprising an outer housing having a base portion adapted to be affixed to the vehicle exterior and a hooded portion defining an open ended cavity, said hooded portion being generally streamlined, said cavity in a planar cross-section being defined by generally diverging parts of said hooded portion one of which parts curves inwardly from said open end toward an axis extending substantially perpendicularly to said open end through its midpoint and in the plane of the cross-section, a supporting member having a mounting portion affixed to said outer housing adjacent said base portion, a journal portion offset from said mounting portion toward said one housing part and an arm portion connecting said journal portion to said mounting portion, a mirror, means for supporting said mirror on said journal portion within said cavity for pivotal movement of said mirror about a center asymmetrically disposed relative to said mirror, and flexible transmitter means operatively connected to said mirror and extending through said outer housing base portion for remote adjustment of the angular position of said mirror.

8. A mirror as set forth in claim 7 wherein the one housing part is disposed at least in part at a lesser distance from the midpoint of the open end of the hooded portion than the corresponding dimension of a portion of the mirror.

9. A mirror as set forth in claim 7 wherein the mirror is a mirror assembly comprised of a reflective mirror and a backing plate, said backing plate being formed from a plastic having relatively little elasticity and defining a guide bushing having an opening therein, the supporting member journal portion defining pin means extending through said guide bushing opening for precluding substantial rotation of said mirror assembly without interfering with the adjustment thereof.

10. A mirror as set forth in claim 9 wherein the backing plate further has flange means formed at its outer periphery receiving the mirror with a snap fit for securing said mirror to said backing plate without the use of adhesives.

References Cited

UNITED STATES PATENTS

| | | | |
|---|---|---|---|
| 3,468,186 | 9/1969 | McIntyre et al. | 74—501 |
| 3,046,841 | 7/1962 | Kawecki | 74—501X |
| 3,183,736 | 5/1965 | Jacobson | 74—501 |
| 3,352,524 | 11/1967 | Rossi | 74—501X |
| 3,370,480 | 2/1968 | Gionet et al. | 74—501 |
| 3,442,150 | 5/1969 | Brawner et al. | 74—501 |

MANUEL A. ANTONAKAS, Primary Examiner

U.S. Cl. X.R.

350—288